United States Patent [19]
Shafiee

[11] Patent Number: 6,124,880
[45] Date of Patent: *Sep. 26, 2000

[54] MULTI-USER VIDEO SWITCHABLE TRANSLATOR

[75] Inventor: Mohammad Reza Shafiee, Ridgefield, Conn.

[73] Assignee: Nynex Science & Technology Inc., White Plains, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,261

[22] Filed: May 24, 1996

[51] Int. Cl.[7] ............................. H04N 7/14; H04M 11/00
[52] U.S. Cl. ............................ 348/15; 348/17; 379/93.15
[58] Field of Search ........................... 348/15–17, 13–14, 348/441, 443–446, 454, 458–9, 12; 379/93.15, 100.13; 455/5.1, 6.1, 6.2

[56] References Cited

U.S. PATENT DOCUMENTS

| | | |
|---|---|---|
| 4,479,195 | 10/1984 | Herr et al. . |
| 5,138,659 | 8/1992 | Kelkar et al. ............................ 348/441 |
| 5,337,089 | 8/1994 | Fisch ........................................ 348/446 |
| 5,381,412 | 1/1995 | Otani . |
| 5,444,491 | 8/1995 | Lim ........................................ 348/441 |
| 5,453,792 | 9/1995 | Gifford et al. ............................ 348/441 |
| 5,475,436 | 12/1995 | Watanabe et al. ....................... 348/441 |
| 5,495,285 | 2/1996 | Fujioka . |
| 5,537,157 | 7/1996 | Washino et al. ......................... 348/445 |
| 5,563,649 | 10/1996 | Gould et al. .............................. 348/17 |
| 5,574,964 | 11/1996 | Hamlin ...................................... 348/13 |
| 5,640,198 | 6/1997 | Makiyama et al. ....................... 348/15 |
| 5,689,553 | 11/1997 | Ahuja et al. .............................. 348/15 |
| 5,689,641 | 11/1997 | Ludwig et al. ........................... 348/16 |

*Primary Examiner*—Forester W. Isen
*Assistant Examiner*—Xu Mei
*Attorney, Agent, or Firm*—Ohlandt, Greeley, Ruggiero & Perle, L.L.P.

[57] ABSTRACT

There is provided a video conferencing system for enabling multiple, remotely located transceivers to communicate with each other, including transceiver that utilize different communication formats or protocols. The video conferencing system includes a telecommunications interface unit and a plurality of transceiver that may connect to the telecommunications unit through telephone or network links. The telecommunications interface unit includes a gateway block corresponding to each transceiver connected to the unit and a switching subsystem for directing communications, particularly video and audio information, between the gateway blocks. The transceivers communicate with their respective gateway blocks using their own communication formats, but the gateway blocks communicate to the switching subsystem using a single common language, such as a standard television signal using the NTSC standard. Accordingly, the present invention permits multiple transceivers using different communication formats to communicate with each other effectively and efficiently.

26 Claims, 2 Drawing Sheets

MULTI-USER VIDEO SWITCHABLE TRANSLATOR

The present invention relates generally to video conferencing systems for public and private networks, such as ISDN and LAN based desktop networks. More particularly, the present invention relates to a telecommunications interface unit that provides video conferencing between two or more transceivers that transmit and receive different communication formats.

BACKGROUND OF THE INVENTION

A video conferencing system includes a plurality of device-specific transceivers that are interconnected by telecommunication lines. The basic components of a transceiver include a processing unit or set box, one or more video input/output devices, and one or more audio input/output devices. For example, the transceiver may be a personal computer having a video conferencing interface board for controlling a video camera, a video screen, an audio microphone and an audio speaker. The interface board captures and digitizes frames of analog video input received from the camera and generates an analog video output for driving images on the screen. In addition, the interface board receives analog audio input from the microphone and sends analog audio output to the speaker.

In addition, each transceiver includes a communications link to one or more other transceivers, such as a LAN controller, an ISDN controller or a telephone modem. Video conferencing systems are capable of performing video conferencing between two or more transceivers so long as the video and audio information communicated between the transceivers are based on the same communication format or protocol. Therefore, when a local transceiver utilizing a particular video and audio format wishes to video conference with a remote transceiver exhibiting a different format, a telecommunications interface unit must be situated between the transceivers to convert the local transceiver's format to the remote transceiver's format. Specifically, the telecommunications interface unit receives telecommunication signals in the first video and audio format, converts the signals to the second video and audio format, and transmits the converted signals to the remote transceiver.

Video conferencing systems for communicating video information from one transceiver to another are generally known. Examples of such systems are described in U.S. Pat. No. 3,618,035 to R. L. Simms, Jr., which issued on Nov. 2, 1971; U.S. Pat. No. 4,995,071 to J. Weber, et al., which issued on Feb. 19, 1991; U.S. Pat. No. 5,315,633 to J. J. Champa, which issued on May 24, 1994; U.S. Pat. No. 5,375,068 to R. S. Palmer, et al., which issued on Dec. 20, 1994; and U.S. Pat. No. 5,438,357 to S. H. McNelley, which issued on Aug. 1, 1995. However, the above patents do not describe any type of telecommunications interface unit for converting a video and audio format used by one transceiver to a different video and audio format used by another transceiver.

Outside of the realm of video conferencing systems, devices for converting video signals from one format or protocol to another are well known. For example, U.S. Pat. No. 5,453,792 to Gifford et al, which issued on Sep. 26, 1995, provides a system for enabling a special effects module, which operates at one frame rate, to be interconnected into a network utilizing a second frame rate. In particular, television signals formatted in a PAL form are converted to a frame rate of 30 frames per second and, then, are applied to the special effects module. After being processed by the module, the resulting signals are reconverted back to the original frame rate and input format for transmission purposes. The system performs the intermediate conversion so that processing can occur in the context of the converted format. Another example of a video conversion device is described in U.S. Pat. No. 5,497,373 to J. S. Hulen, et al., which issued on Mar. 5, 1996. This patent illustrates a multimedia interface with plural digital signal processors ("DSPs"), each one dedicated to conversion of one format into a second signal format. Under control of a host messaging center which receives an indication of the input protocol, a dedicated DSP is selected to perform the conversion.

However, existing video conversion devices do not address the complexity and unique difficulties that are encountered by video conferencing systems. In order to perform video conversion, a telecommunications interface unit must know the exact video and audio formats or protocols of all transceivers that communicate through the unit. This task would be particularly difficult for a telecommunications interface unit that services a large commercial market since such markets have a wide variety of different transceivers that use different communication formats. In addition, the telecommunications interface unit must have a specific conversion unit or routine for every combination of conversions that is possible for these video and audio formats. Accordingly, not only are conventional telecommunications interface units costly to manufacture and maintain, but it is also difficult to keep such units up-to-date as video and audio formats change and/or increase in number. Further, advanced service features, such as dynamic multipoint conferencing, broadcasting, multicasting, global directories, private user groups, video on demand, video mail and security, are difficult and expensive to implement since each feature must be specifically configured for each video and audio format.

SUMMARY OF THE INVENTION

Against the foregoing background, it is a primary object of the present invention to provide a video conferencing system that enables a plurality of remotely located transceivers to communicate with each other, including transceivers that utilize different communication formats or protocols.

It is another object of the present invention to provide such a video conferencing system that includes a gateway interface to convert incoming and outgoing communication signals into a single common language or signal, such as analog television signals in an NTSC format.

It is a further object of the present invention to provide such a video conferencing system using existing technology, particularly a format-specific mating unit, that is readily available to convert all incoming and outgoing communication signals into the common language or signal.

It is a still further object of the present invention to provide such a video conferencing system in which the common language or signal is routed to its ultimate destination and, if desired, processed for implementing advanced features, such as dynamic multipoint conferencing, broadcasting, multicasting, global directories, private user groups, video on demand, video mail and security.

To accomplish the foregoing objects and advantages, the present invention is a conferencing system for enabling remotely located transceivers that use different signal formats to communicate with each other which, in brief summary, comprises a first transceiver, a first gateway block, a second gateway block coupled to the first gateway block and a second transceiver. In particular, the first transceiver sends a first signal having a first signal format that is received by the first gateway block, and the first gateway block converts the first signal to a common format signal. The second gateway block receives the common format signal and converts the common format signal to a second signal having a second signal format. The second signal is received by the second transceiver.

In addition, the video conferencing system of the present invention enables multipoint group conferencing capabilities. In particular, the video conferencing system may include two or more transceivers. Two transceivers may send separate signals to corresponding gateway blocks that convert these signals to respective common format signals. A switching subsystem receives the common format signals from the two gateway blocks and combines these common format signals to produce a third common format signal. A third gateway block receives the third common format signal and converts the third common format signal into a third signal having a third signal format, which is received by a third transceiver. Also, the first common format signal, the second common format signal and the third common format signal have a common format.

Further, the present invention is a conferencing method for enabling remotely located transceivers that use different signal formats to communicate with each other. Initially, a first signal having a first signal format is received from a first transceiver. The first signal is then converted to a common format signal. The common format signal is next converted to a second signal having a second signal format. The second signal is thereafter sent to a second transceiver.

BRIEF DESCRIPTION OF THE DRAWINGS

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

The present invention is an Intelligent Video Conferencing Platform ("IVCP") that is a public/private network-based video conferencing system. The IVCP integrates existing conferencing networks, such as ISDN and LAN based networks, and provides video conferencing interconnectivity between different video environments, such as business video conference rooms, business desktops and work at home. In addition, the IVCP is capable of providing service features including, but not limited to, dynamic multipoint conferencing, broadcasting, multicasting, global directories, private user groups, video on demand, video mail and security.

The IVCP is a system architecture that provides video conferencing services to the subscribers of the service and enables them to communicate regardless of their type of video conferencing hardware or software. For example, subscribers of the video conferencing system may have transceivers that are part of a standard H.320 compatible ISDN systems, LAN based video conferencing environment, non-standard ISDN system or non-standard corporate video conference room system.

Figure 1:
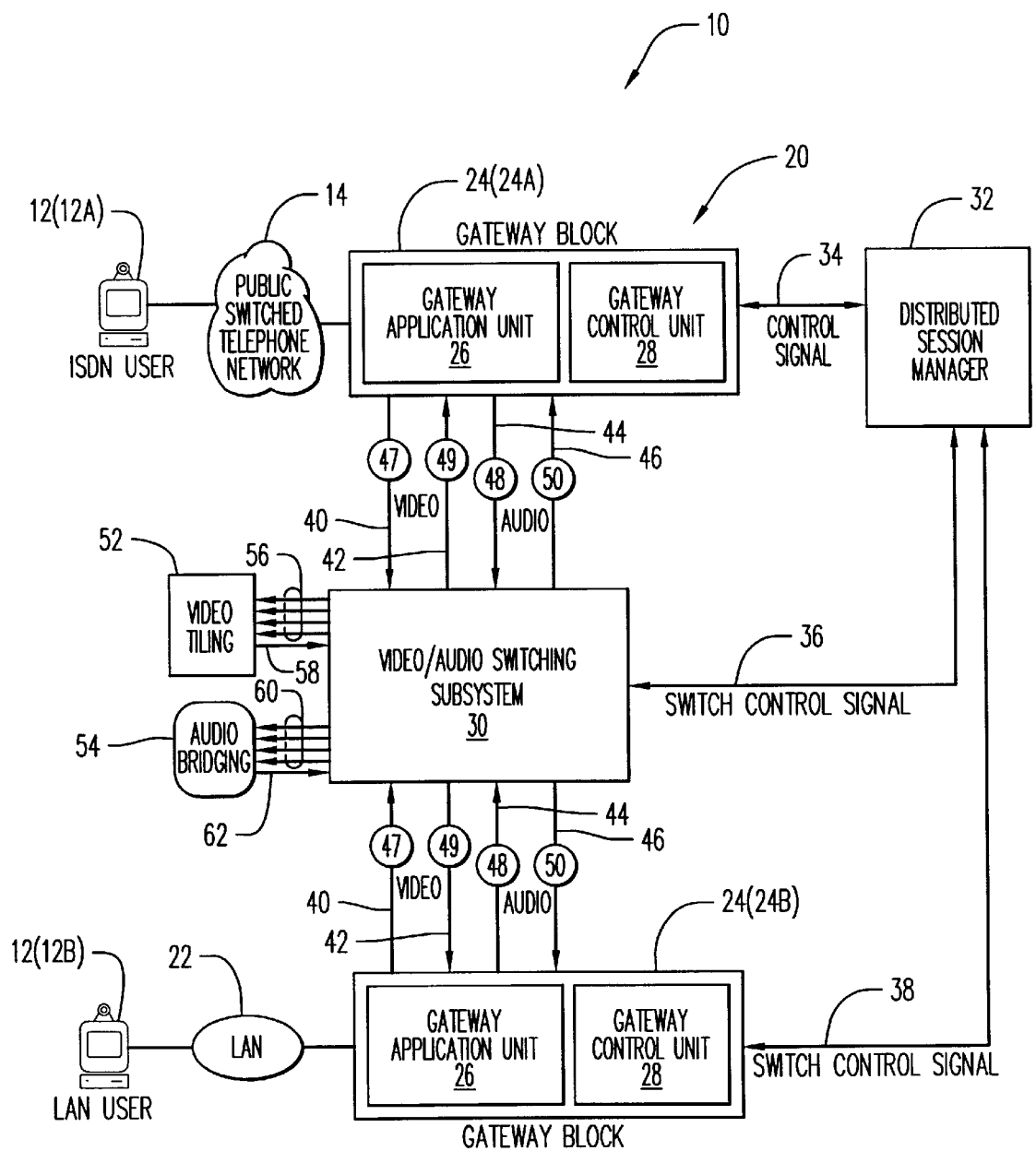
FIG. 1 is a block diagram of the preferred video conferencing system in accordance with the present invention.

Referring to the drawings and, in particular, to FIG. 1, there is provided a video conferencing system of the preferred embodiment which is generally represented by reference numeral 10. The preferred video conferencing system 10 comprises a teleconference interface unit 20 which enables a plurality of remotely located transceivers 12 to communicate with each other, including transceivers 12 which may utilize different communication formats or protocols. In addition, each transceiver 12 includes a communications link to teleconference interface unit 20, such as a LAN controller, an ISDN controller or a telephone modem. For example, as shown in FIG. 1, transceiver 12 having an ISDN controller may connect to teleconference interface unit 20 through a public switched telephone network 14, and a different transceiver having a LAN controller may connect to a private LAN 22 of teleconference interface unit 20.

It is a feature of the present invention to provide a gateway interface or application unit that converts incoming and outgoing communication signals into a single common language or signal, such as analog television signals in an NTSC, SECAM or PAL format. Each gateway interface or application unit must be configured for receiving an incoming signal having particular video and audio format and for converting the incoming signal to the common signal. Although there are a wide variety of disparate teleconferencing transceiver units 12, each unit generally includes or is marketed in conjunction with a format-specific mating unit which acts as receiver/transmitter and exhibits a mating interface protocol. A common feature of all such mating units is that they include interface functions that enable both transmission and reception of analog television signals, specifically in an NTSC format. For example, such mating unit may be another transceiver unit that is capable of communicating video conferencing information in the same format or protocol as the originating transceiver unit 12. The video and audio ports of the transceiver that are normally connected to video devices, such as video cameras and screens, typically provide a standard NTSC signal. Thus, this standard NTSC signal becomes available to the teleconference interface unit 20 through these video and audio ports of the transceiver. Accordingly, for the present invention, a gateway application unit provides analog television signals that are used as the common language or signal for the WCP.

Referring to FIG. 1, teleconference interface unit 20 of the preferred embodiment is a fully distributed, switched network-based platform that comprises a plurality of gateway blocks 24 connected to a video/audio switching subsystem 30. Each gateway block 24 is an integrated component created by combining a gateway application unit 26 with a gateway control unit 28. Each gateway block 24 is an independent processor monitored and controlled by a distributed session manager 32. Distributed session manager 32 is connected to control unit 28 of gateway blocks 24 and switching subsystem 30 by network lines 34, 36, and 38 so that control signals may be communicated among these units.

As described above, gateway application unit 26 is a specific type of mating unit having hardware and software that are compatible with the video and audio format of each transceiver 12. For example, application unit 26 may be a personal computer having a video conferencing interface board, an ISDN or LAN interface and supporting software. The communication links between teleconference interface unit 20 and transceivers 12 are independently handled by application units 26. For a local transceiver 12 of an ISDN environment, the connection between teleconference interface unit 20 and local transceiver 12 is point-to-point, and application unit 26 is treated as if it were a remote transceiver communicating with local transceiver 12. For a local transceiver 12 of a LAN environment (shown in FIG. 2), the LAN environment is bridged to private LAN 22 of teleconference interface unit 20, and application unit 26 acts as another transceiver of the LAN environment.

Gateway control unit 28 is software that is integrated into each individual gateway block 24 of the teleconference interface unit 20. Major functions of control unit 28 include, but are not limited to, providing communication interface between distributed session manager 32 and gateway application unit 26 to transmit and receive call connect, call hangup, line busy, no answer and error messages; providing subscriber directories and menus related to video applications supported by video conferencing system 10, such as video on demand and video mail; and providing a common interface between distributed session manager 32 and the diverse types of applications for gateway application unit 26.

The video and audio inputs and outputs of each gateway block 24, or more precisely the respective application unit 26, are directly connected to switching subsystem 30. For each gateway block 24, the video output port of application unit 26 is connected to the video input port of switching subsystem 30 by video line 40, and the video input port of application unit 26 is connected to the video output port of switching subsystem 30 by video line 42. Similarly, the audio output port of application unit 26 is connected to the audio input port of switching subsystem 30 by audio line 44, and the audio input port of application unit 26 is connected to the audio output port of switching subsystem 30 by audio line 46.

As shown in FIG. 1, video line 40 may include a scan converter 47, and video line 42 may include a video quality enhancer 49. Scan converter 47 receives the common signal produced by application unit 26, such as a super VGA signal, and revises the common signal to a standard video format, such as NTSC, SECAM and PAL. Also, video quality enhancer 49 operates to enhance the video quality for the signals transmitted over video line 42. Likewise, audio line 44 may include an audio balancer 48, and audio line 46 may include an audio amplifier 50 to enhance audio quality.

Distributed session manager 32 of teleconference interface unit 20 is a call session control and management subsystem responsible for several functions. Distributed session manager 32 communicates with gateway block 24, much like a client/server relationship, and serve requests from gateway blocks 24 locally and other distributed session managers (not shown) remotely. Distributed session manager 32 also has full knowledge of the global network topology, and manages and controls all local information and network resources. Other features of distributed session manager 32 include, but are not limited to, controlling audio and video switches locally and maintaining an information table related to port availability; communicating with other distributed session managers to control and manage a call or session; communicating with an advance intelligent network ("AIN") control unit (shown in FIG. 2) to authorize, confirm, reject, reroute, accept or terminate an ISDN call; and confirming the called transceiver's availability before call setup.

Distributed session manager 32 receives a control signal along network line 34 from a particular calling gateway block 24A that identifies receiving transceiver or transceivers, a single receiving transceiver 12B being shown in FIG. 1, to be connected to a calling transceiver 12A. Accordingly, distributed session manager 32 provides a switch control signal along network line 36 to switching subsystem 30 that instructs switching subsystem 30 to direct the common signal produced by calling gateway block 24A to one or more receiving gateway blocks, a single receiving gateway block 24B being shown in FIG. 1. In addition, distributed session manager 32 provides a switch control signal along network line 38 to receiving gateway block 24B that instructs receiving gateway block 24B to direct the call to receiving transceiver 12B.

For operation, calling transceiver 12A generates and sends a first signal to calling gateway block 24A. Application unit 26 of calling gateway block 24A converts this first signal to a common signal, and control unit 28 of calling gateway block 24A provide distributed session manager 32 with information for directing this call. Such information indicates that the call from calling transceiver 12A should ultimately reach receiving transceiver 12B. Switching subsystem 30 receives the common signal from calling gateway block 24A and routes the common signal to one or more remote gateway blocks 24 based on the switch control signal received along network line 36 from distributed session manager 32. This switch control signal along network line 36 informs switching system 30 that the call, specifically the common signal, should be directed to receiving gateway block 24B. It is important to note that distributed session manager 32 must direct the common signal to a gateway block 24 having a gateway application unit 26 that converts the common signal to a second signal having a format and protocol that is used by receiving transceiver 12B. Thus, receiving transceiver 12B receives and processes the second signal as if the second signal had come directly from a calling transceiver that uses the same format and protocol as receiving transceiver 12B.

The video conferencing system 10 of the present invention is also able to provide multipoint group conferencing capabilities between two or more transceivers. In such case, additional transceivers 12 and gateway blocks 24 of teleconference interface unit 20 are utilized. In addition, video and audio information from multiple sources are provided at each transceiver 12. Thus, the video conferencing system 10 includes a video tiling unit 52 and an audio bridging unit 54 connected to switching subsystem 30 for combining multiple video signals and audio signals, respectively. Video tiling unit 52 is an electronic circuit or device that receives a plurality of video images, reduces each image to a fraction of its original size, positions or tiles the reduced images adjacent to each other within a single video image. Accordingly, video tiling unit 52 generates a single video image showing all of the reduced images so that all video images may be viewed simultaneously. Similarly, audio bridging unit 54 is an electronic circuit or device that receives a plurality of audio sounds, such as human voices, and overlaps or bridges those sounds together so that all sounds may be heard simultaneously.

As shown in FIG. 1, a plurality of video lines 56, each carrying a single common signal for a particular transceiver 12, provide common signals to video tiling unit 52, and a single video line 58 transmits a tiled common signal back to switching subsystem 30. Similarly, a plurality of audio lines 60, each carrying a single common signal for a particular transceiver 12, provide common signals to audio bridging unit 54, and a single audio line 62 transmits a bridged common signal back to switching subsystem 30. Although the number of video lines 56 and audio line 60 provided to video tiling unit 52 and audio bridging unit 54, respectively, is not limited, by example, FIG. 1 shows four video lines 56 and four audio lines 60. Accordingly, the tiled common signal of video information and bridged common signal of audio information are forwarded to the appropriate gateway block 24 and corresponding transceiver 12.

The multipoint group conferencing capabilities benefit from the simplicity and efficiency of the present invention. In particular, since a common language or signal is processed by switching subsystem 30, video tiling unit 52 and audio bridging unit 54 only need to deal with this particular format or protocol. If the common language or signal were not used, the first signal of calling transceiver 12A would be directly converted to the second signal of receiving transceiver 12B. For such situation, a separate video tiling unit and audio bridging unit would be required for each format or protocol used by the transceivers. Accordingly, the present invention avoids such complications by using a single common signal for combining multiple video signals and audio signals.

Figure 2:
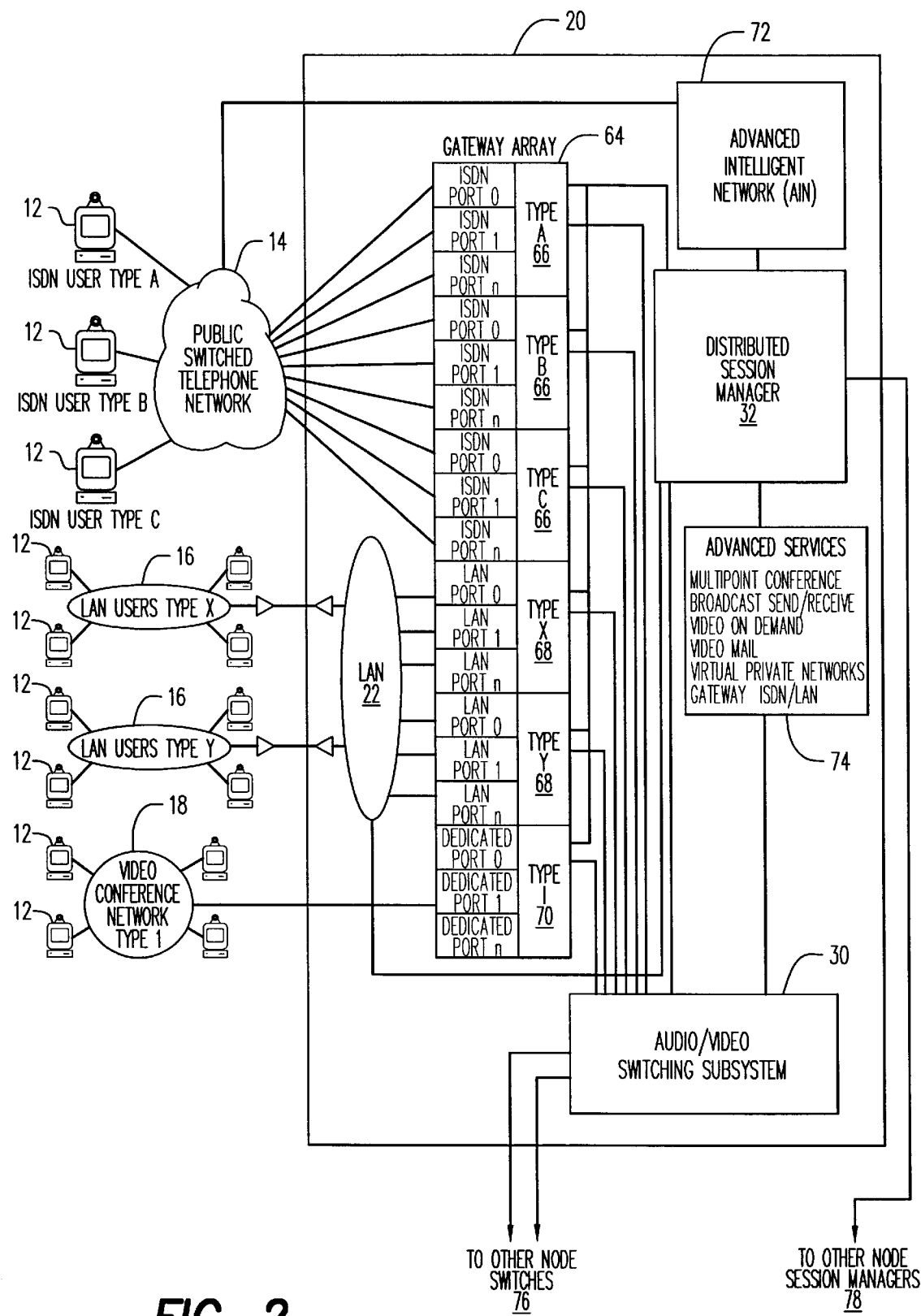
FIG. 2 is a block diagram of a general implementation of the preferred video conferencing system of FIG. 1.

Referring to FIG. 2, there is shown a general implementation of the preferred video conferencing system 10 in accordance with the present invention. FIG. 2 shows a plurality of different types of transceivers 12, which may have a communications link with teleconference interface unit 20. ISDN type transceivers 12 may communicate with a gateway array 64 of teleconference interface unit 20 through a public switched telephone network 14, and LAN type transceivers 12 may communicate with gateway array 64 through its LAN environment 16 and private LAN 22 of teleconference interface unit 20. Also, other transceivers 12, such as those connected to a different type of video conferencing network 18, may have direct connections to gateway array 64.

As shown in FIG. 2, gateway array 64 includes a plurality gateway system units 66, 68 & 70 for receiving video and audio signals from the various transceivers 12 and providing common signals to audio/video switching subsystem 30. In particular, gateway array 64 includes various types of gateway system units such as ISDN type system units 66 for connection to ISDN type transceivers 12 through public switched telephone network 14, LAN type system units 68 for connection to LAN type transceivers 12 through LAN environment 16 and private LAN 22, and dedicated system units 70 for direct connection to other types of transceivers 12. Each gateway system unit 66, 68 & 70 includes a plurality of gateway blocks 24 (shown in FIG. 1) and, thus, may connect to a plurality of transceivers 12 as described above in regard to FIG. 1.

An advanced intelligent network ("AIN") control unit 72 and advanced services unit 74 may also be connected to distributed session manager 32. AIN control unit 72 is a combination of local and public switched telephone network features to provide the call control functions. Advanced services unit 74 provides a multitude of features to video conferencing system 10 which include, but are not limited to, multipoint conferencing, broadcast sending and receiving, video on demand, video mail, virtual private networks and gateways to ISDN and/or LAN systems. In addition, other node switches 76 may be coupled to switching subsystem 30, and other node session managers 78 may be coupled to distributed session manager 32.

The present invention having been thus described with particular reference to the preferred forms thereof, it will be obvious that various changes and modifications may be made therein without departing from the spirit and scope of the invention as defined in the appended claims.

What is claimed is:

1. A conferencing system for enabling remotely located transceivers employing different signal formats to bi-directionally communicate with each other, said conferencing system comprising:

a first transceiver for transmitting a first signal in a first format and receiving a second signal in said first format;

a second transceiver for transmitting said second signal in a second format and receiving said first signal in said second format;

a first gateway for receiving said first signal from said first transceiver, converting said first format to a common format, and transmitting said first signal in said common format, said common format being an analog format, said first gateway also for receiving said second signal in said common format, converting said common format to said first format and transmitting said second signal in said first format to said first transceiver; and a second gateway for receiving said first signal in said common format from said first gateway, converting said common format to said second format, and transmitting said first signal in said second format to said second transceiver, said second gateway also for receiving said second signal in said second format from said second transceiver, converting said second format to said common format and transmitting said second signal in said common format to said first gateway.

2. The conferencing system of claim 1, further comprising a switching subsystem for receiving said first signal in said common format from said first gateway block and routing said first signal in said common format to said second gateway block.

3. The conferencing system of claim 1, wherein said common format is based on at least one video standard selected from the group consisting of: NTSC, SECAM and PAL.

4. The conferencing system of claim 3, further comprising a distributed session manager for providing a control signal to said switching subsystem, wherein said control signal instructs said switching subsystem to direct said first signal in said common format to said second gateway block.

5. The conferencing system of claim 1, further comprising a distributed session manager for providing a control signal to said second gateway block, wherein said control signal instructs said second gateway block to direct said first signal to said second transceiver.

6. The conferencing system of claim 1, further comprising a distributed session manager for receiving a control signal from said first gateway block, wherein said control signal identifies said second transceiver.

7. The conferencing system of claim 1, wherein said first gateway block includes an application unit for converting said first signal to said common format and a control unit for generating a control signal that identifies said second transceiver.

8. The conferencing system of claim 1, wherein said common format includes a common video signal and a common audio signal.

9. The conferencing system of claim 8, further comprising video tiling means for combining a plurality of said common video signals from different gateway blocks into a single tiled video signal, wherein said single tiled video signal becomes a video portion of said common format signal.

10. The conferencing system of claim 8, further comprising audio bridging means for combining a plurality of said common audio signals from different gateway blocks into a single bridged audio signal, wherein said single bridged audio signal becomes an audio portion of said common format signal.

11. The conferencing system of claim 1, wherein said first transceiver and said second transceiver are connected to said first gateway block and said second gateway block, respectively, by at least one communication link selected from the group consisting of: ISDN, LAN, and telephone network.

12. The conferencing system of claim 1, further comprising a scan converter coupled to said first gateway block for receiving a video portion of said first signal in said common format and producing a signal based on at least one video standard selected from the group consisting of: NTSC, SECAM and PAL.

13. A conferencing system for enabling remotely located transceivers employing different signal formats to have multipoint group conferencing capabilities, said conferencing system comprising:
   a first transceiver for transmitting a first signal having a first signal format;
   a first gateway for receiving said first signal from said first transceiver and converting said first signal to a first common format signal;
   a second transceiver for transmitting a second signal having a second signal format;
   a second gateway for receiving said second signal from said second transceiver and converting said second signal to a second common format signal;
   a switching subsystem for combining said first common format signal and said second common format signal to produce a third common format signal representing said combination of said first common format signal and said second common format signal, wherein said first, second and third common format signals have a common analog format;
   a third gateway for receiving said third common format signal and converting said third common format signal into a third signal having a third signal format; and
   a third transceiver for receiving said third signal.

14. The conferencing system of claim 13, wherein said first common format signal, said second common format signal and said third common format signal are based on at least one video standard selected from the group consisting of: NTSC, SECAM and PAL.

15. The conferencing system of claim 13, wherein said first common format signal includes a first common format video signal and a first common format audio signal, and said second common format signal includes a second common format video signal and a second common format audio signal.

16. The conferencing system of claim 15, wherein said switching subsystem includes video tiling means for combining said first common format video signal and said second common format video signal to produce a third common format video signal, wherein said third common format video signal becomes a video portion of said third common format signal.

17. The conferencing system of claim 15, wherein said switching subsystem includes audio bridging means for combining said first common format audio signal and said second common format audio signal to produce a third common format audio signal, wherein said third common audio signal becomes an audio portion of said third common format signal.

18. The conferencing system of claim 13, further comprising a scan converter coupled to each of said first and second gateways for receiving a video portion of said first and second common format signals, respectively, and producing a signal based on at least one video standard selected from the group consisting of: NTSC, SECAM and PAL.

19. A conferencing method for enabling remotely located transceivers employing different signal formats to bi-directionally communicate with each other, the method comprising the steps of:
   receiving a first signal having a first signal format from a first transceiver;
   converting said first signal to a common format signal having an analog format;
   converting said common format signal to a first signal having a second signal format;
   transmitting said first signal having said second signal format to a second transceiver;
   receiving a second signal having said second signal format from said second transceiver;
   converting said second signal to said common format signal;
   converting said common format signal to a second signal having said first signal format; and
   transmitting said second signal having said first signal format to said first transceiver.

20. The conferencing method of claim 19, further comprising directing said common format signal from a first gateway corresponding to said first transceiver to a second gateway corresponding to said second transceiver before the step of converting said common format signal to said second signal.

21. The conferencing method of claim 19, wherein said step of converting said first signal to said common format signal includes converting said first signal to a signal that is based on at least one video standard selected from the group consisting of: NTSC, SECAM and PAL.

22. The conferencing method of claim 19, wherein said step of converting said first signal to said common format signal includes generating a control signal that identifies said second transceiver.

23. The conferencing method of claim 19, wherein said step of converting said first signal to said common format signal includes converting said first signal to a common video signal and a common audio signal.

24. The conferencing method of claim 23, further comprising combining a plurality of said common video signals into a single tiled video signal and including said single tiled video signal with said common format signal before the step of converting said common format signal to said first signal.

25. The conferencing method of claim 23, further comprising combining a plurality of said common audio signals into a single bridged audio signal and including said single bridged audio signal with said common format signal before the step of converting said common format signal to said first signal.

26. The conferencing method of claim 19, further comprising the steps of receiving a video portion of said common video signal and producing a signal that is based on at least one video standard selected from the group consisting of: NTSC, SECAM and PAL, after the step of converting said first signal to said common format signal.

* * * * *